United States Patent
Asanin et al.

(10) Patent No.: US 11,764,439 B2
(45) Date of Patent: Sep. 19, 2023

(54) BATTERY WITH A DEACTIVATION DEVICE, AND MOTOR VEHICLE

(71) Applicant: Bayerische Motoren Werke Aktiengesellschaft, Munich (DE)

(72) Inventors: Savo Asanin, Munich (DE); Amelie Baer, Munich (DE); Aron Varga, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/796,974

(22) PCT Filed: Mar. 8, 2021

(86) PCT No.: PCT/EP2021/055745
§ 371 (c)(1),
(2) Date: Aug. 2, 2022

(87) PCT Pub. No.: WO2021/204474
PCT Pub. Date: Oct. 14, 2021

(65) Prior Publication Data
US 2023/0056487 A1    Feb. 23, 2023

(30) Foreign Application Priority Data
Apr. 7, 2020    (DE) ............. 10 2020 109 634.8

(51) Int. Cl.
*H01M 50/383* (2021.01)
*H01M 50/249* (2021.01)
(Continued)

(52) U.S. Cl.
CPC ....... *H01M 50/383* (2021.01); *H01M 50/204* (2021.01); *H01M 50/222* (2021.01);
(Continued)

(58) Field of Classification Search
CPC . H01M 50/204; H01M 50/249; H01M 50/383
See application file for complete search history.

(56) References Cited

U.S. PATENT DOCUMENTS

| | | | | |
|---|---|---|---|---|
| 4,463,069 A | * | 7/1984 | Greenlee | H01M 50/394 429/88 |
| 4,678,726 A | * | 7/1987 | Buder | H01M 50/392 429/88 |

(Continued)

FOREIGN PATENT DOCUMENTS

| | | |
|---|---|---|
| CN | 109524592 A | 3/2019 |
| DE | 10 2010 034 825 A1 | 2/2012 |

(Continued)

OTHER PUBLICATIONS

International Search Report (PCT/ISA/210) issued in PCT Application No. PCT/EP2021/055745 dated Jun. 2, 2021 with English translation (six (6) pages).

(Continued)

*Primary Examiner* — Jonathan G Jelsma
(74) *Attorney, Agent, or Firm* — Crowell & Moring LLP

(57) ABSTRACT

A battery for a motor vehicle includes at least one cell assembly with a large number of battery cells, wherein the battery cells each have a cell housing with a degassing element for discharging a hot gas produced in the cell housing in the event of a fault, a battery housing with housing walls which enclose a receiving space for receiving the at least one cell assembly, and a deactivation device which is arranged in the receiving space of the battery housing and has at least one sleeve which is filled with a combustion-promoting agent, wherein the sleeve, when it is acted on by the hot gas discharged from at least one battery cell, is configured to release the combustion-promoting agent.

9 Claims, 1 Drawing Sheet

(51) Int. Cl.
*H01M 50/204* (2021.01)
*H01M 50/222* (2021.01)

(52) U.S. Cl.
CPC ...... *H01M 50/249* (2021.01); *H01M 2200/10* (2013.01); *H01M 2220/20* (2013.01)

(56) References Cited

U.S. PATENT DOCUMENTS

| | | |
|---|---|---|
| 2013/0209852 A1 | 8/2013 | Schletterer et al. |
| 2015/0171391 A1* | 6/2015 | Ahn .................... H01M 50/204 429/82 |
| 2018/0047959 A1* | 2/2018 | Kruger ................ H01M 50/367 |
| 2019/0359070 A1 | 11/2019 | Soliman et al. |
| 2020/0295326 A1* | 9/2020 | Qiao ................. H01M 10/0481 |
| 2021/0242531 A1 | 8/2021 | Beck et al. |
| 2021/0367307 A1 | 11/2021 | Raettich et al. |

FOREIGN PATENT DOCUMENTS

| | | |
|---|---|---|
| DE | 10 2013 216 296 A1 | 2/2015 |
| DE | 10 2018 007 664 A1 | 4/2019 |
| DE | 10 2018 112 284 A1 | 11/2019 |
| DE | 10 2018 210 152 A1 | 12/2019 |
| DE | 10 2018 211 316 A1 | 1/2020 |

OTHER PUBLICATIONS

German-language Written Opinion (PCT/ISA/237) issued in PCT Application No. PCT/EP2021/055745 dated Jun. 2, 2021 (five (5) pages).

German-language Search Report issued in German Application No. 10 2020 109 634.8 dated Feb. 19, 2021 with partial English translation (10 pages).

\* cited by examiner

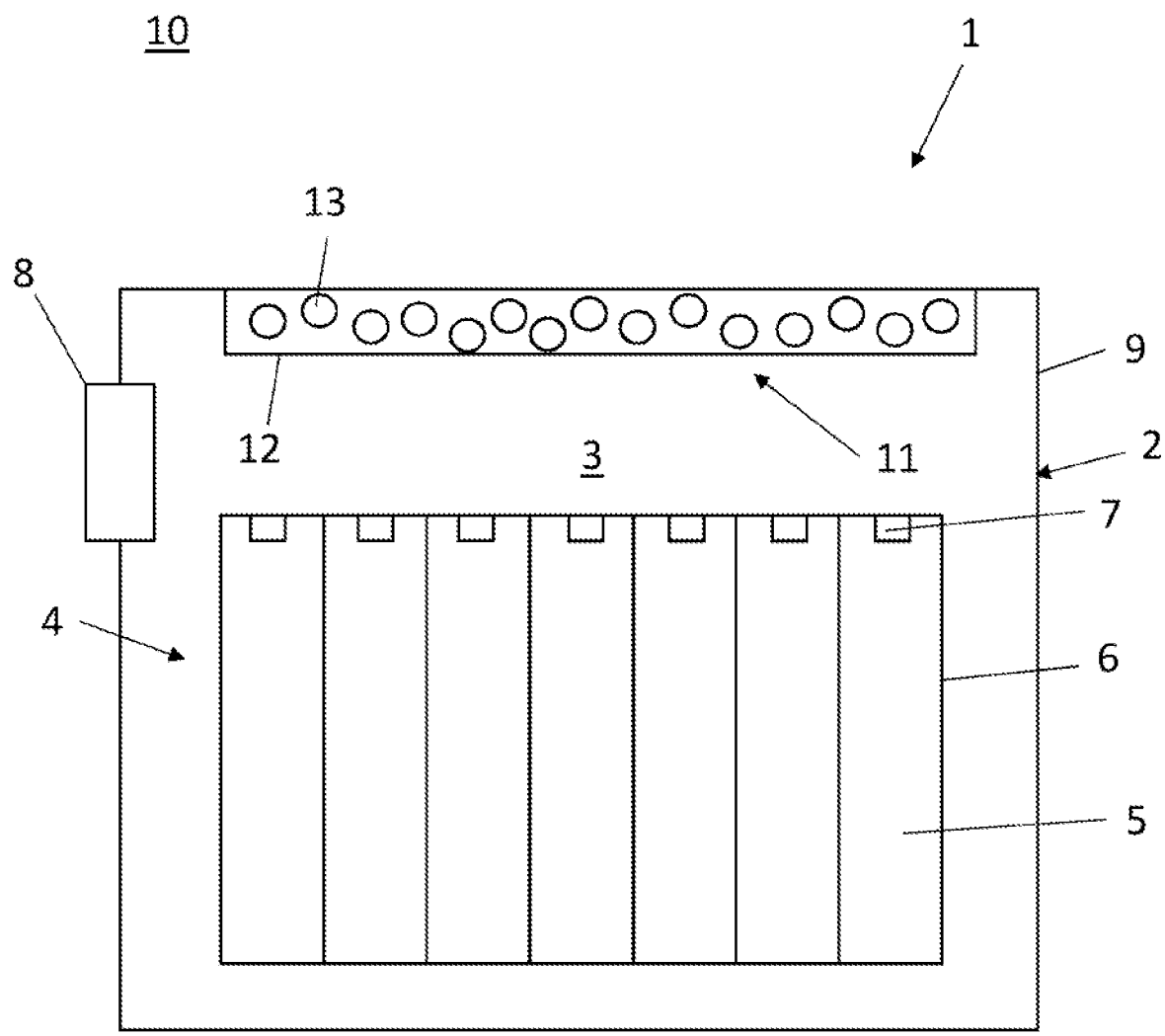

BATTERY WITH A DEACTIVATION DEVICE, AND MOTOR VEHICLE

BACKGROUND AND SUMMARY OF THE INVENTION

The invention relates to a battery for a vehicle, having at least one cell assembly having a multitude of battery cells, wherein the battery cells each have a cell housing with a degassing element for discharging any hot gas that forms in the event of a fault in the cell housing. The battery also has a battery housing having housing walls that surround an accommodation space for accommodating the at least one cell composite. The invention also relates to a vehicle having a battery.

In the present context, interest is directed to rechargeable batteries or accumulators that can be used, for example, as traction batteries in the drivetrain of electrically operable vehicles, for example electrical or hybrid vehicles. Such batteries typically have at least one cell assembly having a multitude of interconnected battery cells disposed in an accommodation space of a battery housing of the battery. The battery cells may, for example, be prismatic battery cells having flat cuboidal cell housings, round cells having cylindrical cell housings, or pouch cells having flexible, film-like cell housings.

The cell housing here typically has a degassing element, for example a burst diaphragm. By way of this degassing element, in the event of a fault, for example in the event of a short circuit within a battery cell, it is possible for a hot gas formed in the cell housing of this battery cell to escape into the accommodation space of the battery housing. This hot gas can then react and ignite with oxygen outside the cell housing. This is intended to prevent the ignition of the hot gas and associated flame formation outside the accommodation space in an environment of the battery.

It is an object of the present invention to provide a solution by which ignition of hot gas outside a battery housing of a battery of a vehicle can be prevented in a simple manner.

This object is achieved in accordance with the battery and the vehicle having the features according to the claimed invention.

A battery for a vehicle has at least one cell assembly having a multitude of battery cells, wherein the battery cells each have a cell housing with a degassing element for discharging any hot gas that forms in the event of a fault in the cell housing. The battery also has a battery housing having housing walls that surround an accommodation space for accommodating the at least one cell composite. The battery additionally has a deactivating device which is disposed in the accommodation space of the battery housing and comprises at least one shell filled with a combustion promoter. The shell, on contact of at least one battery cell with the hot gas discharged, is designed to release the combustion promoter. The combustion promoter is designed to promote controlled burnoff of the hot gas within the accommodation space for deactivation of the hot gas, and hence to prevent ignition of the hot gas outside the accommodation space in an environment of the battery.

The battery may be designed as a traction battery, for example in the form of a high-voltage battery or high-voltage accumulator, for an electrically operable vehicle. The battery cells of the battery are rechargeable battery cells and may, for example, be round cells, prismatic cells or pouch cells. The battery cells each have a galvanic element disposed within the cell housing of the respective battery cell. The cell housing has the degassing element. The degassing element may, for example, be a burst diaphragm or a valve and may normally, i.e. in the absence of the fault, cover a degassing opening in a wall of the cell housing. In the event of a fault, for example in the event of a short circuit within the battery cell, an internal pressure within the cell housing rises, which has the effect that the degassing element opens the degassing opening, for example as a result of bursting of the burst diaphragm or as a result of opening of the valve. For instance, the hot gas can escape from the cell housing to release the internal pressure in the battery cell.

The at least one cell assembly, which may take the form, for example, of a cell stack of prismatic battery cells stacked one on top of another, is disposed within the battery housing. The battery housing is especially formed from a stable metallic material, for example steel or aluminum. The housing walls may, for example, be a lower housing section and an upper housing section surrounding the accommodation space. The battery housing especially has at least one degassing unit disposed within one of the housing walls for discharge of hot gas from the receiving space into an environment of the battery. In order then to prevent the hot gas from a degassing battery cell from leaving the accommodation space, for example when the degassing battery cell is disposed close to the degassing unit of the battery housing, and escaped hot gas ignites with the ambient air, the battery has the deactivation device.

The deactivation device has the at least one shell filled with the combustion promoter. The shell is especially disposed and secured on an inner side of a housing wall of the battery housing facing the degassing elements of the battery cells, for example an inner side of the upper housing section. For example, the at least one shell may be adhesive bonded to the inner side of the housing wall. The combustion promoter is normally disposed within the shell, i.e. in the absence of the hot gas. In particular, the shell is watertight and normally prevents escape of the combustion promoter. The shell may be a film. The film is a polymer film, for example, especially a polyethylene film. The combustion promoter is especially an oxidizing agent in the form of a powder and/or a liquid. For example, the oxidizing agent may be formed by a permanganate and/or sodium percarbonate and/or hydrogen peroxide and/or sodium perborate.

As soon as the shell comes into contact with hot gas, it releases the combustion promoter. For example, the shell may tear or melt on account of the heat from the hot gas and hence release the combustion promoter. The combustion promoter released may react with the hot gas from the at least one battery cell to be degassed. This causes a fire within the battery housing under controlled conditions, which depletes or deactivates the hot gas. The fire here remains within the battery housing. For this purpose, the battery housing is especially designed to keep the burnoff brought about in a controlled manner within the accommodation space. The battery housing is preferably formed from a refractory material. As soon as the hot gas has been activated by the burnoff, it may, for example, exit into the environment via the degassing unit of the battery housing. Once there, on account of the deactivation, it does not ignite again, and so flame formation outside the battery housing can advantageously be prevented.

The invention also includes a vehicle having the battery described herein. The vehicle is especially designed as an electrically operable vehicle and has the battery as traction battery.

The embodiments and their advantages that are presented with reference to the battery of the invention correspondingly apply to the vehicle of the invention.

Further features of the invention will be apparent from the claims, the figure and the description of figures. The features and combinations of features that are mentioned in the description above, and the features and combinations of features that are mentioned in the description of figures and/or shown in the figure alone, are usable not just in the respective combination specified, but also in other combinations or on their own.

The invention is now elucidated by a working example and with reference to the drawing.

BRIEF DESCRIPTION OF THE DRAWING

FIG. 1 shows a schematic diagram of a battery according to an embodiment of the invention.

DETAILED DESCRIPTION OF THE DRAWING

The battery 1 shown in FIG. 1, which can be used as traction battery for a vehicle (not shown here), has a battery housing 2 with a cell assembly 4 disposed in the accommodation chamber 3 thereof. The cell assembly 4 has a multitude of battery cells 5. The cell assembly 4 here is designed as a cell stack of prismatic battery cells 5 stacked one on top of another. The battery cells 5 each have a cell housing 6 with a degassing element 7. The degassing element 7 of a battery cell 5 is designed to allow any hot gas formed in the event of a fault in the battery cell 5 to escape from the cell housing 6 into the accommodation space 3. The degassing element 7 may be designed, for example, as a burst diaphragm.

The degassing of a battery cell 5 can also affect other battery cells 5 and hence trigger a chain reaction of degassing operations. As a result, hot gas collects in the accommodation space 3. If this hot gas escapes from the accommodation space 3 into an environment 10 of the battery 1 via a degassing unit 8 of the battery housing 2 disposed in a housing wall 9 of the battery housing 2, the hot gas could ignite there, and a fire could arise outside the battery housing 2.

In order to prevent this, the battery 1 has a deactivation device 11. The deactivation device 11 is disposed in the accommodation space 3, i.e. within the battery housing 2. The deactivation device 11 has a shell 12 in which a combustion promoter 13 or oxidizing agent is disposed. The combustion promoter 13 is disposed in the shell 12, for example in powder form. If the shell 12, on account of the degassing of at least one of the battery cells 5, is contacted with the hot gas from this battery cell 5, it releases the combustion promoter 13. The shell 12 may be a film that melts when exposed to the hot gas. The combustion promoter 13 reacts here with the hot gas and leads to burnoff of the hot gas within the battery housing 2. This deactivates the hot gas, and it can escape from the accommodation space 3 into the environment 10 in the deactivated state via the degassing unit 8. The combustion promoter 13 thus ignites the hot gas under controlled conditions within the battery housing 2, which then burns off and is deactivated. It is thus possible to prevent the hot gas from reacting further in an uncontrolled manner, for example with the ambient air in the environment 10.

Battery with a Deactivation Device, and Motor Vehicle

The invention relates to a battery for a vehicle, having at least one cell assembly having a multitude of battery cells, wherein the battery cells each have a cell housing with a degassing element for discharging any hot gas that forms in the event of a fault in the cell housing. The battery also has a battery housing having housing walls that surround an accommodation space for accommodating the at least one cell composite. The invention also relates to a vehicle having a battery.

In the present context, interest is directed to rechargeable batteries or accumulators that can be used, for example, as traction batteries in the drivetrain of electrically operable vehicles, for example electrical or hybrid vehicles. Such batteries typically have at least one cell assembly having a multitude of interconnected battery cells disposed in an accommodation space of a battery housing of the battery. The battery cells may, for example, be prismatic battery cells having flat cuboidal cell housings, round cells having cylindrical cell housings, or pouch cells having flexible, film-like cell housings.

The cell housing here typically has a degassing element, for example a burst diaphragm. By means of this degassing element, in the event of a fault, for example in the event of a short circuit within a battery cell, it is possible for a hot gas formed in the cell housing of this battery cell to escape into the accommodation space of the battery housing. This hot gas can then react and ignite with oxygen outside the cell housing. This is intended to prevent the ignition of the hot gas and associated flame formation outside the accommodation space in an environment of the battery.

It is an object of the present invention to provide a solution by which ignition of hot gas outside a battery housing of a battery of a vehicle can be prevented in a simple manner.

This object is achieved in accordance with the invention by a battery and a vehicle having the features according to the respective independent claims. Advantageous executions of the invention are the subject of the dependent claims, the description and the figure.

A battery of the invention for a vehicle battery for a vehicle has at least one cell assembly having a multitude of battery cells, wherein the battery cells each have a cell housing with a degassing element for discharging any hot gas that forms in the event of a fault in the cell housing. The battery also has a battery housing having housing walls that surround an accommodation space for accommodating the at least one cell composite. The battery additionally has a deactivating device which is disposed in the accommodation space of the battery housing and comprises at least one shell filled with a combustion promoter. The shell, on contact of at least one battery cell with the hot gas discharged, is designed to release the combustion promoter. The combustion promoter is designed to promote controlled burnoff of the hot gas within the accommodation space for deactivation of the hot gas, and hence to prevent ignition of the hot gas outside the accommodation space in an environment of the battery.

The battery may be designed as a traction battery, for example in the form of a high-voltage battery or high-voltage accumulator, for an electrically operable vehicle. The battery cells of the battery are rechargeable battery cells and may, for example, be round cells, prismatic cells or pouch cells. The battery cells each have a galvanic element disposed within the cell housing of the respective battery cell. The cell housing has the degassing element. The degassing element may, for example, be a burst diaphragm or a valve and may normally, i.e. in the absence of the fault, cover a degassing opening in a wall of the cell housing. In the event of a fault, for example in the event of a short circuit within the battery cell, an internal pressure within the cell housing rises, which has the effect that the degassing element opens the degassing opening, for example as a result of bursting of the burst diaphragm or as a result of opening of the valve. For instance, the hot gas can escape from the cell housing to release the internal pressure in the battery cell.

The at least one cell assembly, which may take the form, for example, of a cell stack of prismatic battery cells stacked one on top of another, is disposed within the battery housing. The battery housing is especially formed from a stable metallic material, for example steel or aluminum. The housing walls may, for example, be a lower housing section and an upper housing section surrounding the accommodation space. The battery housing especially has at least one degassing unit disposed within one of the housing walls for discharge of hot gas from the receiving space into an environment of the battery. In order then to prevent the hot gas from a degassing battery cell from leaving the accommodation space, for example when the degassing battery cell is disposed close to the degassing unit of the battery housing, and escaped hot gas ignites with the ambient air, the battery has the deactivation device.

The deactivation device has the at least one shell filled with the combustion promoter. The shell is especially disposed and secured on an inner side of a housing wall of the battery housing facing the degassing elements of the battery cells, for example an inner side of the upper housing section. For example, the at least one shell may be adhesive bonded to the inner side of the housing wall. The combustion promoter is normally disposed within the shell, i.e. in the absence of the hot gas. In particular, the shell is watertight and normally prevents escape of the combustion promoter. The shell may be a film. The film is a polymer film, for example, especially a polyethylene film. The combustion promoter is especially an oxidizing agent in the form of a powder and/or a liquid. For example, the oxidizing agent may be formed by a permanganate and/or sodium percarbonate and/or hydrogen peroxide and/or sodium perborate.

As soon as the shell comes into contact with hot gas, it releases the combustion promoter. For example, the shell may tear or melt on account of the heat from the hot gas and hence release the combustion promoter. The combustion promoter released may react with the hot gas from the at least one battery cell to be degassed. This causes a fire within the battery housing under controlled conditions, which depletes or deactivates the hot gas. The fire here remains within the battery housing. For this purpose, the battery housing is especially designed to keep the burnoff brought about in a controlled manner within the accommodation space. The battery housing is preferably formed from a refractory material. As soon as the hot gas has been activated by the burnoff, it may, for example, exit into the environment via the degassing unit of the battery housing. Once there, on account of the deactivation, it does not ignite again, and so flame formation outside the battery housing can advantageously be prevented.

The invention also includes a vehicle having a battery of the invention. The vehicle is especially designed as an electrically operable vehicle and has the battery as traction battery.

The embodiments and their advantages that are presented with reference to the battery of the invention correspondingly apply to the vehicle of the invention.

Further features of the invention will be apparent from the claims, the figure and the description of figures. The features and combinations of features that are mentioned in the description above, and the features and combinations of features that are mentioned in the description of figures and/or shown in the figure alone, are usable not just in the respective combination specified, but also in other combinations or on their own.

The invention is now elucidated by a preferred working example and with reference to the drawing.

The sole figure, FIG. 1, shows a schematic diagram of an embodiment of an inventive battery 1.

The battery 1, which can be used as traction battery for a vehicle (not shown here), has a battery housing 2 with a cell assembly 4 disposed in the accommodation chamber 3 thereof. The cell assembly 4 has a multitude of battery cells 5. The cell assembly 4 here is designed as a cell stack of prismatic battery cells 5 stacked one on top of another. The battery cells 5 each have a cell housing 6 with a degassing element 7. The degassing element 7 of a battery cell 5 is designed to allow any hot gas formed in the event of a fault in the battery cell 5 to escape from the cell housing 6 into the accommodation space 3. The degassing element 7 may be designed, for example, as a burst diaphragm.

The degassing of a battery cell 5 can also affect other battery cells 5 and hence trigger a chain reaction of degassing operations. As a result, hot gas collects in the accommodation space 3. If this hot gas escapes from the accommodation space 3 into an environment 10 of the battery 1 via a degassing unit 8 of the battery housing 2 disposed in a housing wall 9 of the battery housing 2, the hot gas could ignite there, and a fire could arise outside the battery housing 2.

In order to prevent this, the battery 1 has a deactivation device 11. The deactivation device 11 is disposed in the accommodation space 3, i.e. within the battery housing 2. The deactivation device 11 has a shell 12 in which a combustion promoter 13 or oxidizing agent is disposed. The combustion promoter 13 is disposed in the shell 12, for example in powder form. If the shell 12, on account of the degassing of at least one of the battery cells 5, is contacted with the hot gas from this battery cell 5, it releases the combustion promoter 13. The shell 12 may be a film that melts when exposed to the hot gas. The combustion promoter 13 reacts here with the hot gas and leads to burnoff of the hot gas within the battery housing 2. This deactivates the hot gas, and it can escape from the accommodation space 3 into the environment 10 in the deactivated state via the degassing unit 8. The combustion promoter 13 thus ignites the hot gas under controlled conditions within the battery housing 2, which then burns off and is deactivated. It is thus possible to prevent the hot gas from reacting further in an uncontrolled manner, for example with the ambient air 10 in the environment 10.

What is claimed is:

1. A battery for a vehicle, the battery comprising:
   at least one cell assembly having a multitude of battery cells, wherein each of the battery cells has a cell housing with a degassing element for discharging any hot gas that forms in an event of a fault in the cell housing,
   a battery housing having housing walls that surround an accommodation space for accommodating the at least one cell assembly, and
   a deactivating device which is disposed in the accommodation space of the battery housing and comprises at least one shell filled with a combustion promoter, wherein the shell, upon contact with hot gas discharged by the degassing element of at least one of the battery cells, is configured to release the combustion promoter, and wherein the combustion promoter is configured to promote controlled burnoff of the hot gas within the accommodation space for deactivation of the hot gas, and hence to prevent ignition of the hot gas outside the accommodation space in an environment of the battery.

2. The battery according to claim 1, wherein the battery housing has at least one degassing unit disposed in one of the housing walls for discharge of the hot gas deactivated by the burnoff from the accommodation space into the environment of the battery.

3. The battery according to claim 1, wherein the battery housing is configured to keep the burnoff of the hot gas that has been brought about in a controlled manner within the accommodation space.

4. The battery according to claim 1, wherein the battery housing is formed from a refractory material.

5. The battery according to claim 1, wherein the combustion promoter is an oxidizing agent in a form of at least one of a powder or a liquid.

6. The battery according to claim 5, wherein the oxidizing agent is at least one of a permanganate, sodium percarbonate, hydrogen peroxide, or sodium perborate.

7. The battery according to claim 1, wherein the shell is a film.

8. The battery according to claim 7, wherein the film is a polymer film.

9. A vehicle comprising the battery according to claim 1.

* * * * *